United States Patent [19]
Deller et al.

[11] Patent Number: 5,661,397
[45] Date of Patent: Aug. 26, 1997

[54] DEMODULATOR CIRCUIT FOR DETERMINING POSITION, VELOCITY AND ACCELERATION OF DISPLACEMENT SENSOR INDEPENDENT OF FREQUENCY OR AMPLITUDE CHANGES IN SENSOR EXCITATION SIGNAL

[75] Inventors: Robert W. Deller, Saugus; Robert C. Heagey, Santa Clarita, both of Calif.

[73] Assignee: H. R. Textron Inc., Valencia, Calif.

[21] Appl. No.: 532,342

[22] Filed: Sep. 22, 1995

[51] Int. Cl.$^6$ ................ G01B 7/14; G01B 7/30
[52] U.S. Cl. ............... 324/207.18; 324/207.12; 340/870.36
[58] Field of Search ............ 324/207.18, 207.16, 324/207.26, 207.23, 207.24, 207.25, 233, 173, 163, 226, 207.12, 236; 340/870.36, 870.35, 870.31, 870.32; 318/656, 657; 327/72, 11, 7; 329/349

[56] References Cited

U.S. PATENT DOCUMENTS

| | | | |
|---|---|---|---|
| 3,491,289 | 1/1970 | Petrini | 324/207.16 |
| 3,631,355 | 12/1971 | Vail | 329/362 |
| 3,710,267 | 1/1973 | Fawcett | 329/363 |
| 3,714,593 | 1/1973 | Kime et al. | 329/362 |
| 4,047,086 | 9/1977 | Cocksedge | 318/608 |
| 4,100,480 | 7/1978 | Lytle et al. | 324/173 |
| 4,134,065 | 1/1979 | Bauer et al. | 324/207.18 |
| 4,565,970 | 1/1986 | Rider | 329/348 |
| 4,599,560 | 7/1986 | Sanford et al. | 324/207.18 |
| 4,628,270 | 12/1986 | Roberts | 329/360 |
| 4,755,751 | 7/1988 | Ray | 324/207.18 |
| 4,847,556 | 7/1989 | Langley | 324/207.18 |
| 4,857,919 | 8/1989 | Braswell | 324/207.17 |
| 4,875,007 | 10/1989 | Ginns | 324/207.12 |
| 4,904,921 | 2/1990 | DeVito et al. | 323/264 |
| 4,906,924 | 3/1990 | Zannis | 324/207.18 |
| 4,916,391 | 4/1990 | Doerman et al. | 324/207.18 |
| 4,972,163 | 11/1990 | Van Der Plas | 331/12 |
| 4,982,156 | 1/1991 | Lewis et al. | 324/207.18 |
| 4,989,219 | 1/1991 | Gerdes et al. | 375/286 |

FOREIGN PATENT DOCUMENTS

| | | |
|---|---|---|
| 53-119653 | 10/1978 | Japan . |
| 62-215802 | 9/1987 | Japan . |
| 697800 | 4/1978 | Russian Federation . |

Primary Examiner—Sandra L. O'Shea
Assistant Examiner—Jay M. Patidar
Attorney, Agent, or Firm—Robbins, Berliner & Carson, LLP

[57] ABSTRACT

To allow a displacement sensor to operate independently of changes in the excitation signal to the transducer, a demodulating circuit is provided wherein comparison is made between the excitation signal and a reference signal, the comparison is used to adjust an output generating circuit which generates the output from the transducer. Advantageously, the output generating circuit can provide movement information from output of the transducer which include position, velocity and acceleration.

24 Claims, 3 Drawing Sheets

DEMODULATOR CIRCUIT FOR DETERMINING POSITION, VELOCITY AND ACCELERATION OF DISPLACEMENT SENSOR INDEPENDENT OF FREQUENCY OR AMPLITUDE CHANGES IN SENSOR EXCITATION SIGNAL

TECHNICAL FIELD OF THE INVENTION

The present invention is related in general to displacement sensors such as linear variable differential transformers (LVDTs) and rotary variable differential transformers (RVDTs), and in particular to a circuit for demodulating the output of a displacement sensor. More particularly, the present invention is related to a demodulator circuit capable of decoding the output of a displacement sensor to provide displacement, velocity and acceleration information independent of changes in the amplitude and/or frequency of the excitation signal operating the sensor.

BACKGROUND OF THE INVENTION

Displacement sensors such as LVDTs and RVDTs are commonly used in various applications, such a actuators connected to aero-space vehicle control surfaces, machine tools and the like, for movement detection. A displacement sensor generally has a primary coil and two secondary coils. The coils are wound on a bobbin wherein a movable slug is enclosed. The primary coil receives an excitation signal which induces mutually opposite currents in the two secondary coils. Because the position of the slug affects the inductance between the primary coil and each of the secondary coils, the currents induced in the secondary coils by the excitation signal can thus be used to detect position of the slug.

Unfortunately, the currents induced in the secondary coils are also dependent upon the frequency and amplitude of the excitation signal. If either the amplitude or the frequency of the excitation signal changes, the output of the sensors would change even when the slug remains stationary. Therefore, to operate properly, conventional displacement sensors generally require an excitation signal with stable amplitude and frequency.

Operability and cost of sensors would greatly improve if a stable excitation signal is not required. For example, if there is no requirement of a stable excitation signal, the sensor can then be operated with the same excitation signal which is used to drive the LVDT of an actuator can also be used to drive a hydraulic valve's LVDT, thus eliminating the possibility of "beat" frequencies which could occur when two different excitation signals are used.

Therefore, what is needed is a displacement sensor which can provide accurate displacement information without requiring a stable excitation signal.

Moreover, in applications such as a high performance control loop, information on velocity and acceleration of the slug, in addition to its displacement, are sometimes required for stabilization purposes. Unfortunately, to provide velocity and acceleration information, conventional displacement sensors either require additional transducers, or a slug that has both high permeability and magnetic retentability.

Therefore, what is also needed is a displacement sensor which can provide velocity and/or acceleration information without the need of additional transducers and without the need of a special slug.

SUMMARY OF THE INVENTION

The present invention is related to a circuit for use with a displacement sensor which produces an output signal in response to an excitation signal. The circuit according to the present invention is capable of demodulating the output signal of the displacement sensor to provide displacement information independent of changes in the excitation signal. It comprises a circuit for generating the displacement information from the output signal, and simultaneously generating an adjustment generating signal based upon the excitation signal and adjusting operation of the displacement circuit accordingly.

According to another aspect of the present invention there is provided a method for demodulating an output signal from a displacement sensor. The output signal is generated by the displacement sensor in response to an excitation signal. The method comprises the steps of (a) integrating the output signals, (b) integrating a reference signal generated from the excitation signal and (c) adjusting the integrating step of (a) based upon result of the integrating step of (b).

DESCRIPTION OF THE PREFERRED EMBODIMENTS

Figure 1:
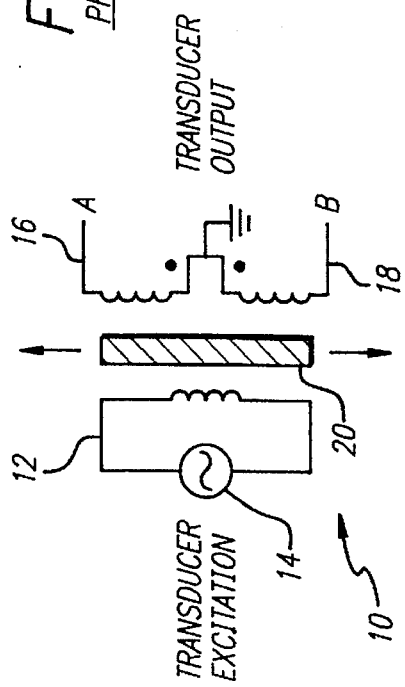
FIG. 1 is a schematic diagram depicting a conventional displacement sensor.

FIG. 1 is a schematic diagram of a conventional LVDT 10 having a primary coil 12 which receives an excitation signal from a source 14 to induce an output A in a first secondary coil 16 and an output B in a second secondary coil 18. The source 14 can be a signal generator producing either a sine wave, square wave, triangular wave or other type of signal. The outputs A and B are generated in response to the excitation signal and are dependent upon the position of a slug 20 relative to the primary coil 12 and the two secondary coils 16, 18. The secondary coils 16, 18 are connected in such a way that outputs A and B are mutually opposite.

Figure 4:
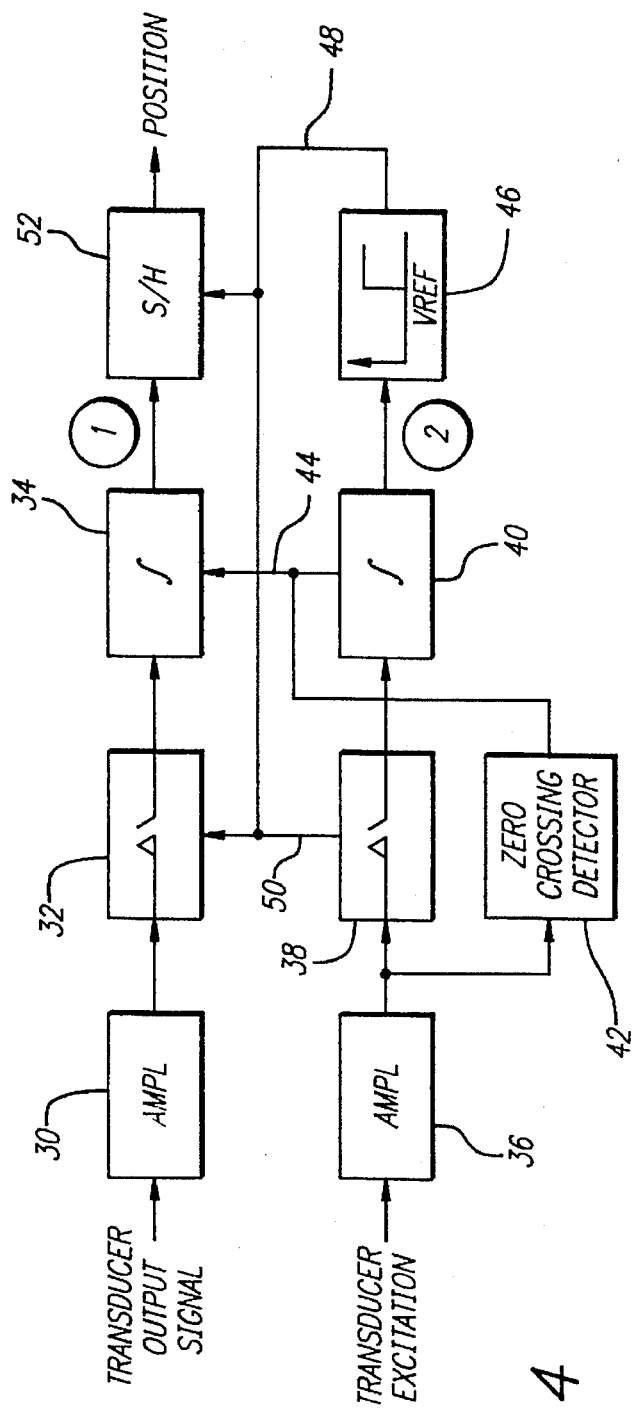
FIG. 4 is a simplified block diagram illustrative of the philosophy of operation of the ratiometric demodulator system of the present invention.

Referring now more particularly to FIG. 4 there is illustrated a very generalized block diagram which is illustrative of and can be used in explaining the philosophy regarding the operation of the ratiometric demodulator of the present invention. As is therein shown the transducer output signal is applied to an amplifier 30, the output of which is applied to a switch 32 and through it to a first integrator 34. At the same time the transducer excitation signal is applied to an amplifier 36, the output of which is applied to a switch 38 which in turn connects the signal to a second integrator 40. At time equals zero the two switches 32 and 38 are closed. As the transducer excitation signal passes through zero a zero crossing detector 42 generates a signal which is applied over the leads 44 to activate the two integrators 34 and 40. They then start integrating the signal which is applied to them, namely, the transducer output signal which is applied to the integrator 34 and the transducer excitation signal which is applied to the integrator 40. This integration continues until the output of the integrator 40 reaches a predetermined voltage reference level which is represented at 46. At that point in time, there is generated a signal at the output 48 which is applied over the leads 50 to open the switches 32 and 38 thus disconnecting the integrators 34 and 40 from their respective input signals. At the same time, the output signal from the comparator 46 appearing on the lead 48 is applied to a sample and hold circuit 52, the output of which represents the position of the slug 20 which is connected to the device, the position of which is of interest in the particular application of concern.

So long as the two integrators 34 and 40 are identical it can be seen that the output signal from the sample and hold circuit 52 will be accurate since the start and stop of the integrator 34 is controlled by the excitation signal for the transducer which provides the position information. Therefore, if the transducer excitation signal drifts either as to amplitude or frequency such is compensated for by the integrator 40 having the duration during which it integrates the excitation signal determined by a fixed voltage reference signal which is applied to the comparator 46 and is used to determine when the integrators are caused to stop integrating. Obviously, if there are discrepancies between the two integrators 34 and 40 (which usually will occur to some degree) then adjustments must be made. These adjustments are discussed more in detail below in conjunction with the more detailed block diagram showing a specific implementation of a ratiometric demodulator constructed in accordance with the principles of the present invention.

Figure 2:
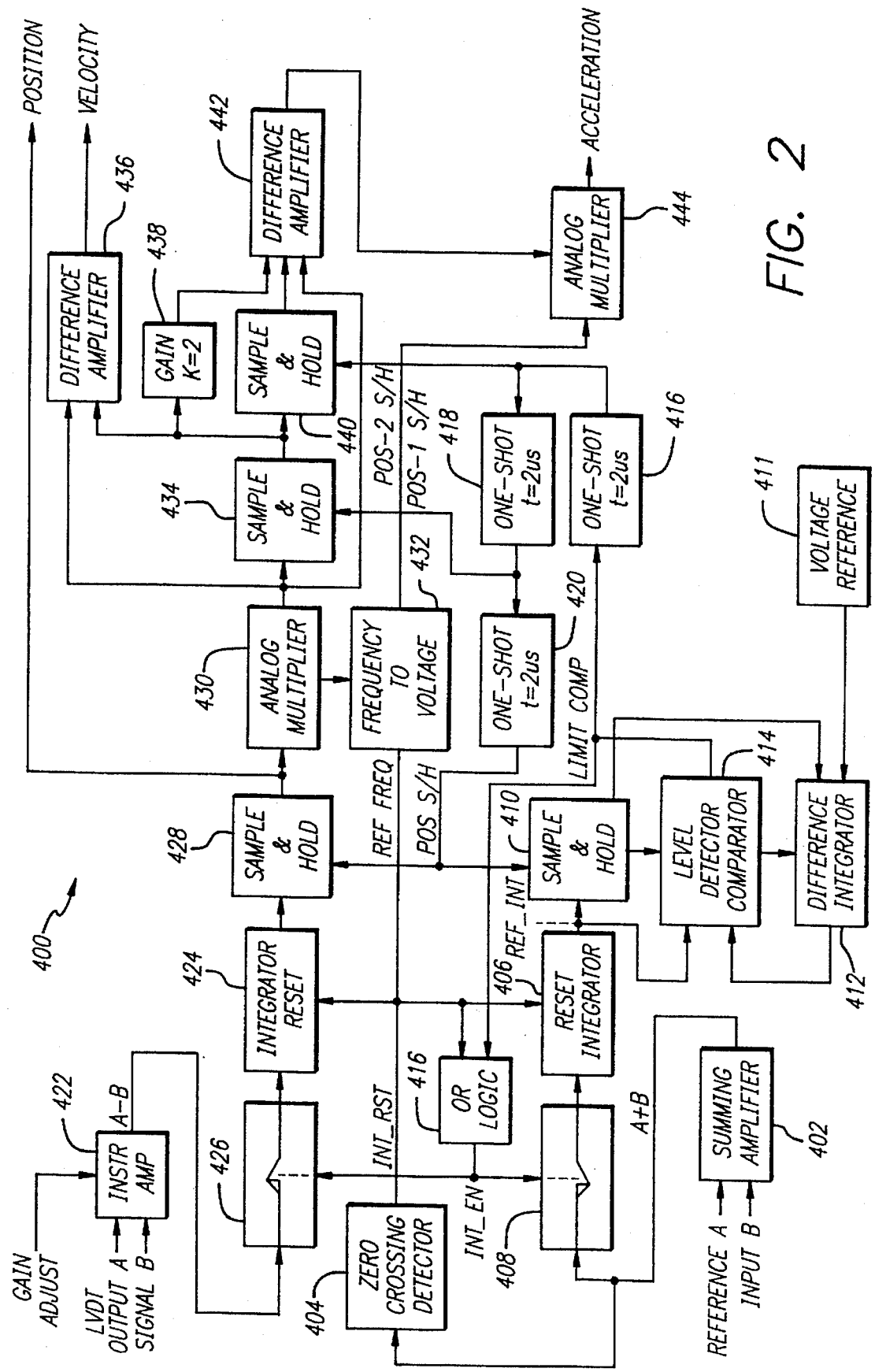
FIG. 2 is a block diagram of one specific embodiment of a demodulator according to the present invention.

FIG. 2 is a block diagram of a demodulator 400 which is a preferred an embodiment of the present invention. To facilitate discussion thereof, the demodulator 400 is separated into a first and a second segment. The function of the first segment is to generate control signals based upon a reference signal. The function of the second segment is to demodulate a LVDT output signal in response to control signals generated by the first segment.

With reference to FIG. 2, the first segment of the demodulator 400 comprises an amplifier 402 for receiving the reference input which is the sum (A+B) of the two secondary outputs A and B from the LVDT 10. The reference signal A+B is converted into a square wave signal by a zero-crossing detector 404. The output, INT_RST, of the zero-crossing detector 404 is applied to the reset input of a reference integrator 406.

The reference integrator 406 integrates the reference signal A+B applied from the amplifier 402 through a switch 408. The output, REF_INT, of the reference integrator 406 is sampled by a sample-and-hold circuit 410. The output of the sample-and-hold circuit 410 is compared with a voltage reference 411 at the input of a difference integrator 412. The output of the difference integrator 412 is compared with the output REF_INT of integrator 406 at a level detector comparator 414. The output of comparator 414 is applied to an "OR" gate 416. The output of the "OR" gate 416 is used to control the switch 408, for example, if output of "OR" gate 416 is "1" switch 408 is opened and if output of "OR" gate 416 is "0", switch 408 is closed. The output of the level detector comparator 414 is also applied to a one-shot circuit 416. The output of circuit 416 is a control signal POS-2 S/H. POS-2 S/H is applied to another one-shot circuit 418 the output of which is a control signal POS-1 S/H. POS-1 S/H is applied to another one-shot circuit 420 the output of which is a control signal POS_S/H.

The LVDT output signal (A−B) is received by the demodulator 400 into an instrumentation amplifier 422. The output of the instrumentation amplifier 422 is applied to an integrator 424 through a switch 426 which is also controlled by the output of the "OR" gate 416 e.g., if the output of "OR" gate 416 is "1", switch 426 is opened and if the output of "OR" gate 416 is "0", switch 426 is Closed. The integrator 424 is reset after each cycle of the reference input by the output of the zero-crossing detector 404.

The output of the integrator 424 is sampled by a first sample-and-hold circuit 428 under the control of the POS_S/H signal. The output of the first sample-and-hold circuit 428 gives the position of the slug.

The output of the first sample-and-hold circuit 428 is adjusted in response to change in the frequency of the reference input. The adjustment is accomplished by an analog multiplier 430 which multiplies the output of the first sample-and-hold circuit 428 by a voltage generated by a frequency-to-voltage converter 432 in response to the frequency of the reference input.

The output of the analog multiplier 430 is sampled by a second sample-and-hold circuit 434 under the control of the POS-1 S/H signal. A difference between the output of the analog amplifier 430 and the output of the second sample-and-hold circuit 434 is determined by the first difference amplifier 436. The output of the first difference amplifier 436 gives the velocity of the slug.

The output of second sample-and-hold circuit 434 is also applied to an amplifier 438 with a gain of two. The output of the second sample-and-hold circuit 434 is also applied to a third sample-and-hold circuit 440. A difference between the output of the x2-amplifier 438 and the output of the third sample-and-hold circuit 440 is calculated at a difference amplifier 442. The output of the difference amplifier 442 is adjusted in response to the frequency of the reference input at an analog multiplier 444 using the output from the converter 432. The output of the analog multiplier 444 gives the acceleration of the slug.

Operation of the demodulator as above described will now be discussed with more detailed reference to the timing diagram shown in FIG. 3. At time ta, switches 408 and 426 are closed and the reference signal 202 (A+B) is connected to the input of integrator 406 when the zero crossing detector generates a signal as shown at 204 and 206 the integrators 406 and 424 are activated. As shown in line 4D of FIG. 3, the voltage REF_INT at the output of the integrator 406 rises. When REF_INT rises to a level equal to or higher than the voltage LIMIT 208 from the difference integrator 412, the output LIMIT_COMP of the level detector comparator 414 drops, as shown at 210 in line 4E of FIG. 3.

Figure 3:
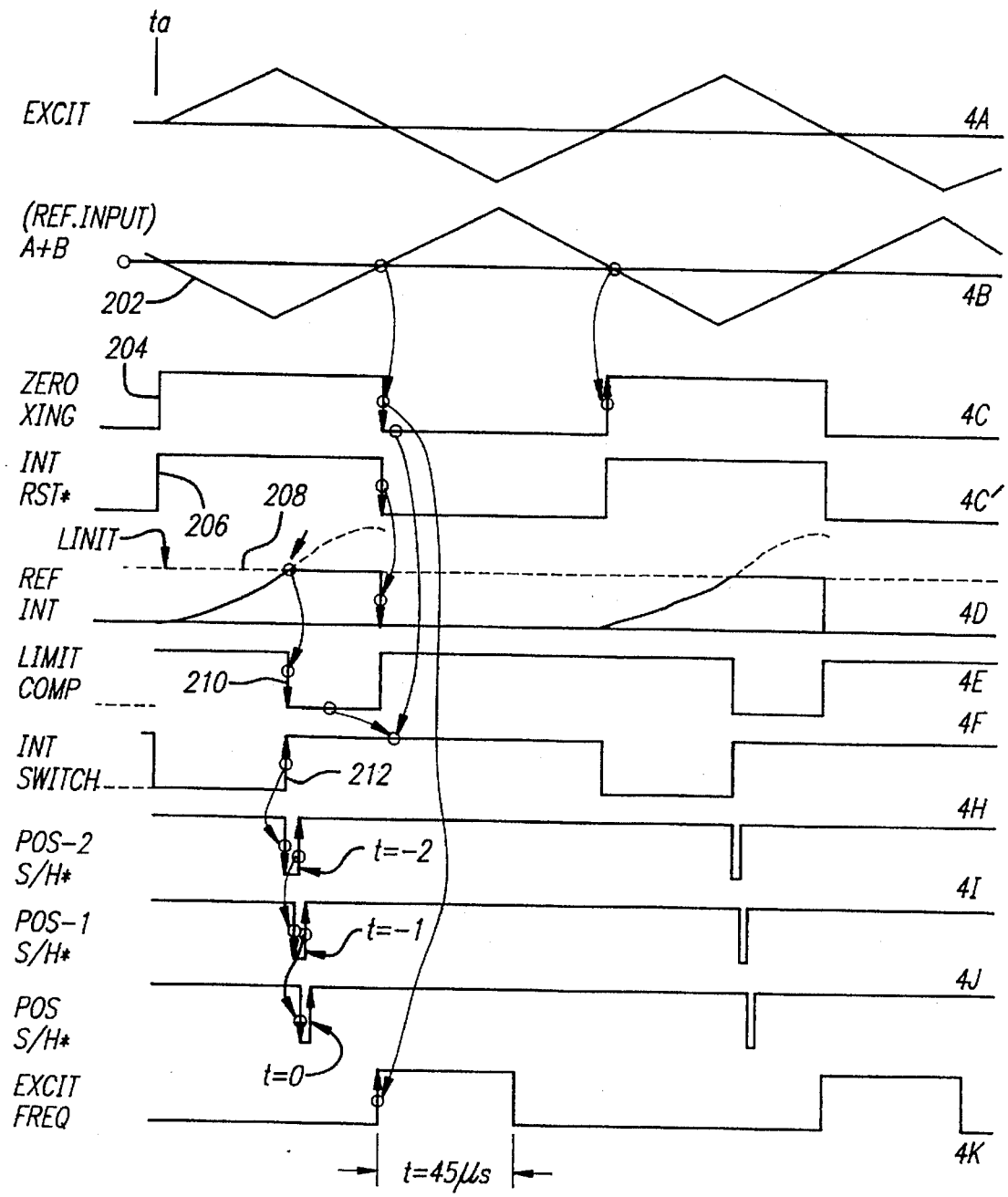
FIG. 3 shows the timing of the outputs at various parts of the demodulator of FIG. 2.

When LIMIT_COMP drops, the output INT_SWITCH of the OR gate 416 rises as shown at 212 in line 4F of FIG. 3, opening the switches 408 and 426 and disconnecting the reference signal from the integrator 406 and also the LVDT output signal from the integrator 424. The duration during which switches 408 and 426 remain closed is a function of the time it takes for the output of integrator 406 to reach the voltage LIMIT 208, which in turn is a function of how fast the integral of the reference input signal can reach LIMIT 208, which turn is a function of the amplitude and frequency of the reference input signal.

The LVDT output signal is integrated by integrator 424. However, the time in which the LVDT output signal is integrated is limited by the time which switch 426 remains closed. As noted above this is a function of the amplitude and frequency of the reference input signal. That is, switch 426 opens when the output of reference integrator 406 reaches the reference voltage 208.

The output of integrator 424 is sampled by a sample-and-hold circuit 428 under the control of the POS_S/H signal as shown at 4J. The output from the sample-and-hold circuit 428 gives the position of the slug at $t_0$.

The output of sample-and-hold circuit 428, after being adjusted by a multiplier (to be discussed), is sampled by another sample-and-hold circuit 434 under the control of a signal POS-1 S/H as shown at 4I. Referring to FIG. 3, lines 4H–4J, since POS-1 S/H precedes POS_S/H, sample-and-hold circuit 434 therefore stores the position of the slug at time ($t_{-1}$), one excitation cycle earlier than $t_0$.

Velocity of the slug is equal to the difference between $S(t_0)$ and $S(t_{-1})$, divided by the period $t_1 - t_0$ of the reference signal. If the frequency of the reference input shifts, $t_0 - t_{-1}$ changes. To compensate for frequency changes in the reference input, the output of the sample-and-hold circuit 428 is applied to one input of the analog multiplier 430. Multiplier 430 multiplies the output of the sample-and-hold circuit 428 by a voltage which is converted from the frequency of the reference signal by converter 432. Velocity of the slug is determined by calculating the difference between the output of multiplier 430 and the output of sample-and-hold circuit 434 at the difference amplifier 436.

The output of the second sample-and-hold circuit 434 is applied to the x2-multiplier 438. The output of sample-and-hold circuit 434 is also sampled by another sample-and-hold circuit 440 under the control of a signal POS-2S/H as shown at 4H. Because POS-2S/H occurs before POS-1S/H, sample-and-hold circuit 440 therefore represents the position of the slug at time ($t_{-2}$), one excitation cycle earlier than the position stored in sample-and-hold circuit 434, and two excitation cycles earlier than the position stored in sample-and-hold circuit 428.

A difference between the outputs of the x2-multiplier 438 and sample-and-hold circuit 440 is calculated at a difference amplifier 442.

Acceleration of the slug is equal to the rate of change of velocity between $t_0$ and $t_{-2}$. If the frequency of the reference input shifts, $t_0 - t_{-2}$ would change. To compensate for frequency changes in the reference input, output of the difference amplifier 442 is applied to one input of an analog multiplier 444. Multiplier 444 multiplies the output of amplifier 442 by a voltage which is converted from the frequency of the reference signal by converter 432. The output of multiplier 444 gives the acceleration of the slug adjusted for frequency change.

It will be understood that the demodulator according to the invention can be used advantageously in a variety of systems ranging from low bandwidth simplex systems to high bandwidth triplex or quad redundant systems.

The above description of the preferred embodiment is provided for illustration. It will be understood that certain modifications can be made thereto without departing from the scope of the invention which is defined by the following claims.

What is claimed is:

1. For use with a displacement sensor which produces an output signal in response to an excitation signal, a demodulator circuit for demodulating the output signal to provide displacement information independent of charges in the excitation signal, comprising:

a circuit for generating the displacement information from the output signal; and an adjustment circuit for monitoring a reference signal generated based upon the excitation signal and adjusting operation of the generating circuit based upon changes in the frequency and/or the amplitude of the reference signal over a time period.

2. A demodulator as in claim 1, wherein the adjustment circuit comprises an automatic gain control which adjusts the amplitude of the output signal applied to the generating circuit.

3. A demodulator as in claim 1, wherein the adjustment circuit comprises a reference integrator for integrating the reference signal and a comparator circuit for comparing an output of the reference integrator against a predetermined signal.

4. A demodulator as in claim 1, wherein the generating circuit comprises an output integrator for integrating the output signal to generate the displacement information.

5. A demodulator as in claim 4, further comprising a circuit for recording output of the output integrator at more than one time instant.

6. A demodulator as in claim 5, wherein the recording circuit comprises a circuit for recording an output $S(t_0)$ of the output integrator at a first time instant $t_0$, an output $S(t_{-1})$ of the output integrator at a second time instant $t_{-1}$ before the first time instant $t_0$, and an output $S(t_{-2})$ of the output integrator at a third time instant $t_{-2}$ before the second time instant $t_{-1}$.

7. A demodulator as in claim 6, wherein said recording circuit comprises a plurality of sampling circuits.

8. A demodulator as in claim 6, further comprising a circuit for calculating $S(t_0) - S(t_{-1})$ to determine velocity of a displacement.

9. A demodulator as in claim 6, further comprising a circuit for calculating $S(t_0) + S(t_{-2}) - 2S(t_{-1})$ to determine acceleration of a displacement.

10. A demodulator as in claim 1, wherein the generating circuit comprises means for integrating the output signal over a time period to generate the displacement information, and wherein the adjustment circuit comprises means for integrating the reference signal and means responsive to output of the reference signal integrating means for adjusting the time period in which the output signal is integrated.

11. A demodulator as in claim 10, further comprises a circuit for recording an output of the output signal integrating means at more than one time instant.

12. A demodulator as in claim 11, wherein the recording circuit include a circuit for recording an output $S(t_0)$ of the output integrator at a first time instant $t_0$, an output $S(t_{-1})$ of the output integrator at a second time instant $t_{-1}$ before the first time instant $t_0$, and an output $S(t_{-2})$ of the output integrator at a third time instant $t_{-2}$ before the second time instant $t_{-1}$.

13. A demodulator as in claim 12, wherein said recording circuit comprises a plurality of sampling circuits.

14. A demodulator as in claim 13, further comprising a circuit for calculating $S(t_0) - S(t_{-1})$ to determine velocity of a displacement.

15. A demodulator as in claim 12, further comprising a circuit for calculating $S(t_0) + S(t_{-2}) - 2S(t_{-1})$ to determine acceleration of a displacement.

16. A demodulator as in claim 12, further comprising a circuit for modifying the time instants $t_{-1}$ and $t_{-2}$ in response to a change of the frequency of excitation signal.

17. A demodulator as in claim 10, wherein the output signal integrating means comprises:

a first integrator;

a first switch selectively coupling the output signal to the first integrator; and a first sampling circuit coupled to sample output of the first integrator; and wherein the reference signal integrating means comprises:

a second integrator, a second switch selectively coupling the reference signal to the second integrator;

a second sampling circuit coupled to sample output of the second integrator;

a third integrator coupled to receive output of the second sampling circuit and a predetermined voltage;

a comparator coupled to compare an output of the second integrator and an output of the third integrator, an output of the comparator being applied to control the first switch and the second switch; and a timing circuit response to an output from the comparator for providing timing signals to the sampling circuits.

18. A demodulator as in claim 17, further comprising a first multiplier coupled to receive output of the first sampling circuit, a converter for providing a voltage based upon the frequency of the reference signal, the voltage from the converter being applied to the first multiplier, a third sampling circuit coupled to sample output of first multiplier and a first difference circuit for providing a difference between output of the third sampling circuit and output of the first multiplier.

19. A demodulator as in claim 18, further comprising an amplifier for amplifying output of the third sampling circuit by a factor of two, a fourth sampling circuit coupled to sample output of the third sampling circuit, a second difference circuit for providing a difference between output of the amplifier and output of the fourth sampling circuit and a second multiplier coupled to receive output of the second difference circuit and output of the converter.

20. A demodulator as in claim 19, further comprising circuit responsive to output from the comparator for controlling the recording circuit.

21. A demodulator as in claim 20, wherein said circuit for controlling the recording circuit comprises a plurality of one-shot circuits.

22. A method for demodulating an output signal from a displacement sensor, the output signal being generated by the displacement sensor in response to an excitation signal, the method comprising the steps of:

(a) integrating the output signal;

(b) integrating a reference signal generated from the excitation signal until the integrated reference signal reaches a predetermined level; and (c) adjusting the integrating step (a) based upon the time required to reach the predetermined level of the integrating step (b).

23. A method as in claim 22, wherein the adjusting step (c) adjusts the integrating step (a) by adjusting amplitude of the output signal to be integrated by the integrating step (a).

24. A method as in claim 22, wherein the adjusting step (c) adjusts the integrating step (a) by adjusting the duration of integration of the integrating step (a).

* * * * *